(12) United States Patent
Mukherjee et al.

(10) Patent No.: US 12,141,147 B2
(45) Date of Patent: Nov. 12, 2024

(54) MANAGEMENT OF DATABASE JOIN OPERATIONS

(71) Applicant: Dell Products L.P., Round Rock, TX (US)

(72) Inventors: Proma Mukherjee, Kolkata (IN); Seenivasan Manavalasamy, Bangalore (IN); Dhilip S. Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/111,058

(22) Filed: Feb. 17, 2023

(65) Prior Publication Data

US 2024/0281440 A1 Aug. 22, 2024

(51) Int. Cl.
*G06F 16/245* (2019.01)
*G06F 16/2453* (2019.01)
*G06N 3/092* (2023.01)

(52) U.S. Cl.
CPC ....... *G06F 16/24544* (2019.01); *G06N 3/092* (2023.01)

(58) Field of Classification Search
None
See application file for complete search history.

(56) References Cited

U.S. PATENT DOCUMENTS

| 9,886,524 | B1* | 2/2018 | Richardson | G06F 16/951 |
| 9,992,269 | B1* | 6/2018 | Odom | G06F 16/24568 |
| 2002/0087654 | A1* | 7/2002 | Feigenbaum | G06F 16/90 |
| 2012/0215764 | A1* | 8/2012 | Barsness | G06F 16/951 |
| | | | | 707/720 |
| 2015/0180963 | A1* | 6/2015 | Luecke | G06F 16/35 |
| 2021/0165782 | A1* | 6/2021 | Deshpande | G06F 16/2393 |
| 2023/0129665 | A1* | 4/2023 | Kumar | G06F 16/90 |
| 2023/0141023 | A1* | 5/2023 | McCann | G06F 16/9538 |
| | | | | 707/706 |
| 2023/0195745 | A1* | 6/2023 | Jain | G06F 16/24578 |
| | | | | 707/770 |
| 2023/0394549 | A1* | 12/2023 | Li | G06F 16/90328 |

OTHER PUBLICATIONS

Microsoft, "Joins in Azure Cosmos DB," https://learn.microsoft.com/en-US/azure/cosmos-db/nosql/query/join, Oct. 12, 2022, 9 pages.
S. Yildirim, "SQL vs NoSQL—Join Operations," https://towardsdatascience.com/sql-vs-nosql-join-operations-401f18a8a53b, Jan. 25, 2021, 9 pages.

(Continued)

*Primary Examiner* — Son T Hoang
(74) *Attorney, Agent, or Firm* — Ryan, Mason & Lewis, LLP

(57) ABSTRACT

A method comprises receiving a request to combine data from a plurality of data collections based on one or more constraints, and analyzing the request using one or more machine learning algorithms to determine an order by which respective ones of the plurality of data collections are to be searched. The respective ones of the plurality of data collections are searched according to the determined order, and an output of combined data from the searching is generated in response to the request.

20 Claims, 26 Drawing Sheets

(56) References Cited

OTHER PUBLICATIONS

C. Buckler, "Using Joins in MongoDB NoSQLDatabases," https://www.sitepoint.com/using-joins-in-mongodb-nosql-databases/, Sep. 30, 2016, 11 pages.
Oracle, "SQL Reference Guide—Joins," https://docs.oracle.com/en/database/other-databases/nosql-database/21.1/sqlreferencefornosql/joins.html, Accessed Feb. 17, 2023, 2 pages.
Wikipedia, "Depth-first Search," https://en.wikipedia.org/wiki/Depth-first_search, Jan. 22, 2023, 7 pages.

\* cited by examiner

| User Request | Model-A and Model - B | Output |
|---|---|---|
| Domain 1, Domain 2,Domain 3,Domain 4 | Shortest Distance : Domain 3 to Domain 1 | |
| | Next Shortest Distance : Domain 1 to Domain 2 | Domain 3 --> Domain 1 --> Domain 2 --> Domain 4 |
| | Next Shortest Distance : Domain 2 to Domain 4 | |
| Domain 1, Domain 6,Domain 3,Domain 5 | Shortest Distance : Domain 3 to Domain 6 | |
| | Next Shortest Distance : Domain 6 to Domain 1 | Domain 3 --> Domain 6 --> Domain 1 --> Domain 5 |
| | Next Shortest Distance : Domain 1 to Domain 5 | |
| Domain 3, Domain 6,Domain 7,Domain 9 | Shortest Distance : Domain 7 to Domain 9 | |
| | Next Shortest Distance : Domain 9 to Domain 6 | Domain 7 --> Domain 9 --> Domain 6 --> Domain 3 |
| | Next Shortest Distance : Domain 6 to Domain 3 | |

```
sequential_search(args*, dom_list):
    for i : [0, len(dom_list)]:
        if(i>=2):
            dom_data = NoSQL_search(args*, level_i.data);
        else
            dom_data = NoSQL_search(args*)//first domain
        if (HasValues(dom_data))
            level_i = new Level("level"+i, dom_data);
        else if (dom_data.Count = 0)
            return empty list;//there is no common data point
        else
            level_i = prev_level;
        prev_level = level_i;
        i++;
    return prev_level.data
```

FIG. 8

$N_c \propto S$ $N_c \propto \dfrac{1}{N_p}$ $N_c = K \dfrac{S}{N_p}$ $T_D = K \dfrac{SS'}{N_{p'}}$ $T_{D2} = 0.5\ \text{sec}$

| | Number of unique content items | Total load time | Unique content displayed | Number of repeated content items | Size of repeated content items |
|---|---|---|---|---|---|
| Domain-1 | 500 | 12.5 sec | [...] | 3 | 3 MB |
| Domain-2 | 400 | 3 sec | [...] | 2 | 1.2 MB |
| Domain-3 | 200 | 2.5 sec | [...] | 2 | 0.6 MB |
| Domain-4 | 180 | 2.0 sec | [...] | 1 | 0.7 MB |
| Domain-5 | 300 | 1.4 sec | [...] | 3 | 0.8 MB |

```
class SequentialSearchEnvironment(gym.Env):
    """A sequential search environment"""
    def __init__(self, df):
        super(SequentialSearchEnv, self).__init__()
        self.df = df
        self.reward_range = (0, MAX_REWARD)
        # Actions of the format Domain-1, Domain-2, Domain-3, etc.
        self.action_space = spaces.Box(low=np.array([0, 0]), high=np.array([N, 1]), dtype=np.int32)
        # Defining observation space
        self.observation_space = spaces.Box(
            low=0, high=1, shape=(1, 2), dtype=np.int32)
```

FIG. 17

```
def reset(self):
    # Reset the state of the environment to an initial state
    self.time = INITIAL_TIME
    self.memory = INITIAL_MEMORY
    last_action = INITIAL_BUFFER
    # Only permit current observation within permissible transaction limit (Semi-policy for DDPG)
    if(last_action == INITIAL_BUFFER):
        self.current_step = random.randint(0, len(self.df.loc[:, 'index_name'].values) - N)
    while(calculate(self.df.loc[self.current_step], self.df.loc[self.last_action]) > TRANSITION_LIMIT):
        self.current_step = random.randint(0, len(self.df.loc[:, 'index_name'].values) - N)
    last_action = current_step
    return self._next_observation()

def calculate(dom1, dom2):#calculate total time to perform the search
        timer start;
        sequential_search(args*, [dom1, dom2]);
        timer end;
        return total time;

def _next_observation(self):
    # Get the data points and scale to between 0-1
    frame = np.array([[
        self.df.loc[self.current_step: self.current_step, 'time_taken'].values / MAX_TIME
    ]])
    # Append additional data and scale each value to between 0-1
    obs = np.append(frame, [[
        self.time / MAX_TIME,
        self.memory / MAX_MEMORY
    ]], axis=0)
    return obs
```

FIG. 18

```
def ddpg_model(
    self,
    #self represents out customized env: SequentialSearchEnvironment
    ac_kwargs=dict(),
    seed=0,
    save_folder=None,
    num_train_episodes=1000,
    test_agent_every=20,
    replay_size=int(1e6),
    gamma=0.99,
    decay=0.99,
    mu_lr=1e-3,
    q_lr=1e-3,
    batch_size=30,
    start_steps=5000,
    action_noise=0.0,
    max_episode_length=500):

tf.random.set_seed(seed)
    np.random.seed(seed)
    num_states = self.observation_space.shape[0]
    num_actions = self.action_space.shape[0]
    action_max = self.action_space.high[0]
```

```
#Actor optimization
   with tf.GradientTape() as tape2:
      Aprime = action_max * mu(X)
      temp = tf.keras.layers.concatenate([Xten,Aprime],axis=1)
      Q = q_mu(temp)
      mu_loss = -tf.reduce_mean(Q)
   grads_mu = tape2.gradient(mu_loss,mu.trainable_variables)
   mu_losses.append(mu_loss)
   mu_optimizer.apply_gradients(zip(grads_mu, mu.trainable_variables))

#Critic Optimization
   with tf.GradientTape() as tape:
      next_a = action_max * mu_target(X2)
      temp = np.concatenate((X2,next_a),axis=1)
      q_target = R + gamma * (1 - D) * q_mu_target(temp)
      temp2 = np.concatenate((X,A),axis=1)
      qvals = q_mu(temp2)
      q_loss = tf.reduce_mean((qvals - q_target)**2)
   grads_q = tape.gradient(q_loss,q_mu.trainable_variables)
   q_optimizer.apply_gradients(zip(grads_q, q_mu.trainable_variables))
   q_losses.append(q_loss)
```

```
Updating both netwokrs
updating Critic network temp1 = np.array(q_mu_target.get_weights())
temp2 = np.array(q_mu.get_weights())
temp3 = decay*temp1 + (1-decay)*temp2
q_mu_target.set_weights(temp3)

# updating Actor network
temp1 = np.array(mu_target.get_weights())
temp2 = np.array(mu.get_weights())
temp3 = decay*temp1 + (1-decay)*temp2
mu_target.set_weights(temp3)

return (returns,q_losses,mu_losses)
```

FIG. 21

MANAGEMENT OF DATABASE JOIN OPERATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to management of database join operations in such information processing systems.

BACKGROUND

A join operation combines data between databases based on some matching criteria. Join operations differ between structured query language (SQL) and not only SQL (NoSQL) databases. An SQL join operation is used in relational databases, enabling users to, for example, aggregate rows from two or more tables by utilizing a field (e.g., column) that is shared by the two or more tables.

SQL databases are normalized to decrease redundancy and remove dependency anomalies. NoSQL databases are designed to hold denormalized data and, in some cases, there is no relationship between NoSQL databases. As a result, a join operation of NoSQL databases may result in information being provided more than once. This can be undesirable since there are few circumstances in which relational data is not used. With current approaches, NoSQL join operations utilize large amounts of memory and time since the operations are implemented mostly through nested looping and/or intermediary lookup concepts.

SUMMARY

Embodiments provide a join operation management platform in an information processing system.

For example, in one embodiment, a method comprises receiving a request to combine data from a plurality of data collections based on one or more constraints, and analyzing the request using one or more machine learning algorithms to determine an order by which respective ones of the plurality of data collections are to be searched. The respective ones of the plurality of data collections are searched according to the determined order, and an output of combined data from the searching is generated in response to the request.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 4 depicts a table illustrating different execution sequence outputs by a machine learning model in response to different requests in an illustrative embodiment.

FIG. 5 depicts different domain-based data models in an illustrative embodiment.

FIG. 8 depicts example pseudocode for a sequential search algorithm in an illustrative embodiment.

FIG. 15 depicts operational data for a plurality of domains that is used to train a DDPG algorithm in an illustrative embodiment.

FIG. 17 depicts example pseudocode for defining a custom environment, an action space and an observation space for a DDPG algorithm in an illustrative embodiment.

FIG. 18 depicts example pseudocode for defining customized reset and next observation functions for a DDPG algorithm in an illustrative embodiment.

FIG. 19 depicts example pseudocode for defining a sequential search environment for a DDPG algorithm in an illustrative embodiment.

FIG. 20 depicts example pseudocode for defining actor and critic optimization for a DDPG algorithm in an illustrative embodiment.

FIG. 21 depicts example pseudocode for updating critic and actor networks for a DDPG algorithm in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Figure 1:
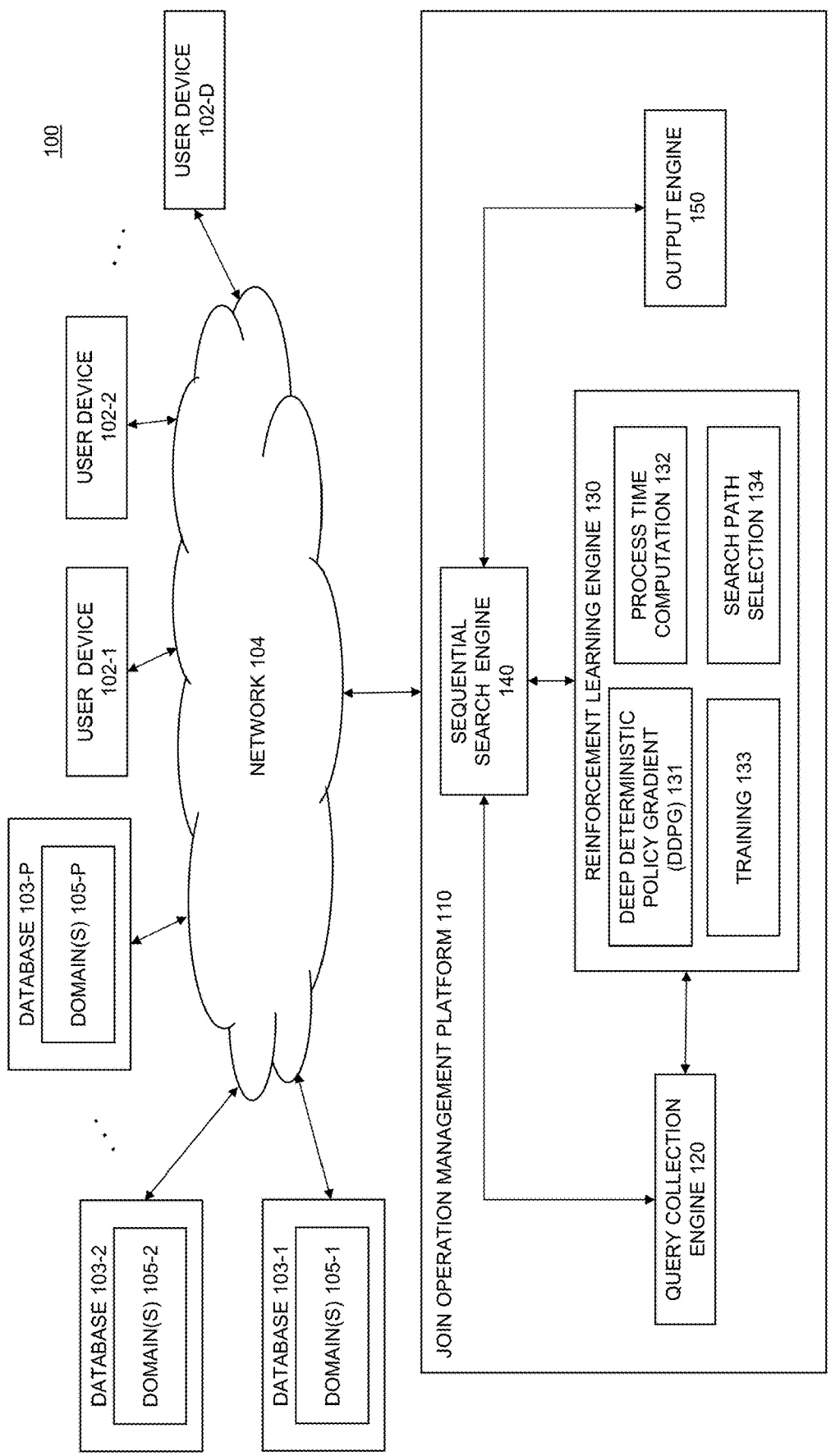
FIG. 1 depicts an information processing system with a join operation management platform for managing NoSQL join operations in an illustrative embodiment.

FIG. 1 shows an information processing system 100 configured in accordance with an illustrative embodiment. The information processing system 100 comprises user devices 102-1, 102-2, ... 102-D (collectively "user devices 102") and databases 103-1, 103-2, ... 103-P (collectively "databases 103"). Each of the databases 103 corresponds to one or more domains 105-1, 105-2, ..., 105-P (collectively "domains 105") The user devices 102 and databases 103 communicate over a network 104 with a join operation management platform 110. The variables D and P and other similar index variables herein such as K and L are assumed to be arbitrary positive integers greater than or equal to one.

As used herein, a "domain" is to be broadly construed to refer to, for example, a data collection associated with a data model such as, for example, a table, document, schema, index, etc. In illustrative embodiments, a domain comprises a data store used by a particular domain team, which may be restricted from viewing and editing by members of other domains. Some examples of domains include, but are not necessarily limited to, an order domain, a payment domain, a customer domain and a pricing domain. Domains may be identified by designated domain names and domain identifiers (domain IDs). The databases 103 may correspond to one or more domains 105.

The user devices 102 and devices hosting the databases 103 can comprise, for example, desktop, laptop or tablet computers, servers, host devices, storage devices, mobile telephones, Internet of Things (IoT) devices or other types of processing devices capable of communicating with the join operation management platform 110 over the network 104. Such devices are examples of what are more generally referred to herein as "processing devices." Some of these processing devices are also generally referred to herein as "computers." The user devices 102 and devices hosting the databases 103 may also or alternately comprise virtualized computing resources, such as virtual machines (VMs), containers, etc. The user devices 102 and devices hosting the databases 103 in some embodiments comprise respective computers associated with a particular company, organization or other enterprise. It is to be understood that although the embodiments are discussed in terms of user devices 102 and devices hosting the databases 103 (e.g., customer, client or administrator devices), the embodiments are not necessarily limited thereto, and may be applied to different devices (e.g., edge or cloud devices).

The terms "user," "customer," "client" or "administrator" herein are intended to be broadly construed so as to encompass numerous arrangements of human, hardware, software or firmware entities, as well as combinations of such entities. Join operation management services may be provided for users utilizing one or more machine learning models, although it is to be appreciated that other types of infrastructure arrangements could be used. At least a portion of the available services and functionalities provided by the join operation management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the join operation management platform 110, as well as to support communication between the join operation management platform 110 and connected devices (e.g., user devices 102 and devices hosting the databases 103) and/or other related systems and devices not explicitly shown.

In some embodiments, the user devices 102 and devices hosting the databases 103 are assumed to be associated with repair and/or support technicians, system administrators, information technology (IT) managers, software developers, release management personnel or other authorized personnel configured to access and utilize the join operation management platform 110.

As noted above, with current approaches, NoSQL join operations utilize large amounts of memory and time. In such a scenario, a cross-domain join is difficult, if not impossible, to achieve. NoSQL databases may allow the same hierarchy joins only in certain scenarios and with certain configurations (e.g., nested tables and left outer joins). Existing NoSQL joins are not scalable and most often involve non-tunable and complicated queries.

In an effort to address the above technical problems, illustrative embodiments provide for management of join operations through sequential search techniques and a deep deterministic policy gradient (DDPG) reinforcement learning algorithm. The sequential search and machine learning techniques work together to produce domain-based NoSQL join operations using less time and compute resources than conventional techniques. The embodiments are scalable, so that as many domains as necessary can be dynamically added to a join operation without impact on a system's performance.

The join operation management platform 110 in the present embodiment is assumed to be accessible to the user devices 102 and databases 103 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the join operation management platform 110 includes a query collection engine 120, a reinforcement learning engine 130, a sequential search engine 140 and an output engine 150. The reinforcement learning engine 130 comprises a deep deterministic policy gradient (DDPG) layer 131, a process time computation layer 132, a training layer 133 and a search path selection layer 134.

Figure 3:
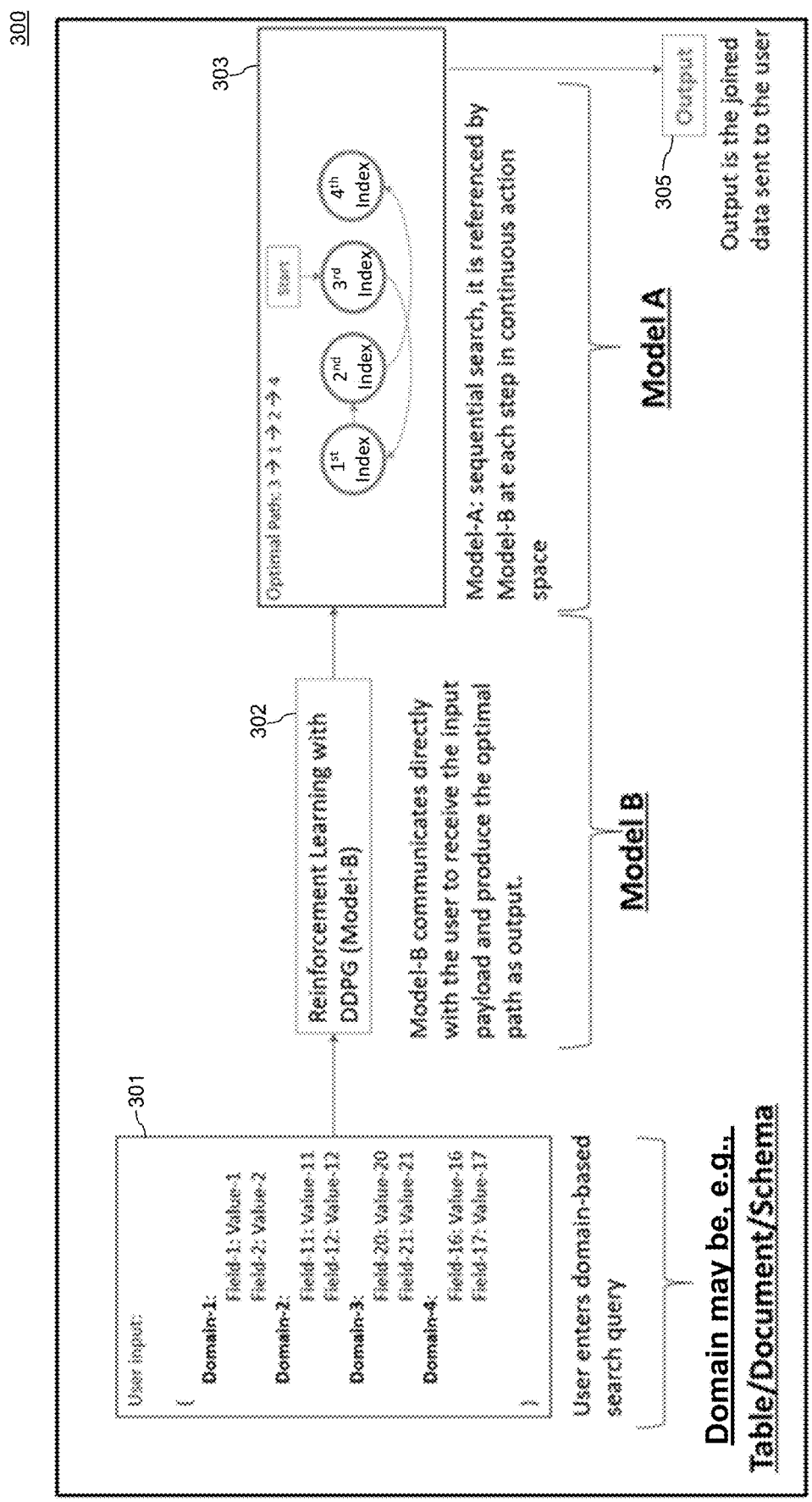
FIG. 3 depicts an operational flow for management of NoSQL join operations in an illustrative embodiment.

The query collection engine 120 receives from, for example, a user device 102, a request to combine data from a plurality of data collections based on one or more constraints. The plurality of data collections may comprise a plurality of domains 105 corresponding to one or more databases 103, which may be, for example, NoSQL databases. In an embodiment, the one or more constraints comprise one or more fields of the plurality of domains. For example, referring to the operational flow 300 in FIG. 3, user input 301 depicts an example request. The user input 301 comprises, for example, a domain-based search query specifying a plurality of domains (Domain-1, Domain-2, Domain-3 and Domain-4), fields (e.g., Field-1, Field-2, Field-11, Field-12, Field-20, Field-21, Field-16 and Field-17) associated with respective ones of the plurality of domains, and values (e.g., Value-1, Value-2, Value-11, Value-12, Value-20, Value-21, Value-16 and Value-17) corresponding to the respective fields. As noted herein above, the domains can be associated with different data models such as, for example, tables, documents, schemas, etc. As can be understood, the user input 301 comprises a payload including the requested information from each domain that is to be combined in a join operation.

As used herein, a "field" and "value" are to be broadly construed to refer to, for example, a key and a value, respectively, of any key-value pair of data (e.g., as in a JavaScript Object Notation (JSON) document). In this context, an entire NoSQL store can be treated as a nested JSON document, where each domain may have multiple key-value pairs of data.

The reinforcement learning engine 130 analyzes the user input 301 using one or more machine learning algorithms to determine an order by which respective ones of the plurality of data collections are to be searched by the sequential search engine 140. For example, the one or more machine learning algorithms comprise a reinforcement learning algorithm such as a DDPG reinforcement learning algorithm. The DDPG layer 131 applies the DDPG reinforcement learning algorithm (reinforcement learning with DDPG (Model-B) 302 in FIG. 3) to determine an optimal order (e.g., optimal path 303 in FIG. 3) by which the plurality of data collections (e.g., domains) are to be searched for the relevant constraints (e.g., fields and corresponding values) in connection with the join operation. The sequential search engine 140 searches the respective ones of the plurality of data collections (e.g., domains) according to the determined order, and the output engine 150 generates an output (e.g., output 305 in FIG. 3) of the combined data of the data collections from the searching in response to the request. The output 305 is transmitted to a user via, for example, the network 104 and one or more user devices 102.

In illustrative embodiments, the sequential search engine 140 executes the search following an order determined by the reinforcement learning engine 130, moving from one domain to the next. In order to carry out the search, for each successive domain, the sequential search engine 140 takes parameters from the domain that came before it in the determined order. In other words, the searching of the respective ones of the plurality of domains comprises using one or more parameters from a previous one of the plurality of domains in the determined order when searching a next one of the plurality of domains in the determined order. This procedure is repeated until all of the data collections (e.g., domains) have been analyzed, at which point the merged data is the result (e.g., output 305).

As used herein, a "parameter" is to be broadly construed to refer to, for example, a search keyword provided by a user based on a search requirement. There can be different sets of search parameters for each domain, for example if the user specifies "order-type". "abc", then this becomes a search parameter for the order domain.

In illustrative embodiments, the sequential search capability combined with DDPG reinforcement learning creates a search facility that is capable of performing scalable domain-based NoSQL joins in a smooth manner and with optimal use of time and compute resources.

Figure 2:
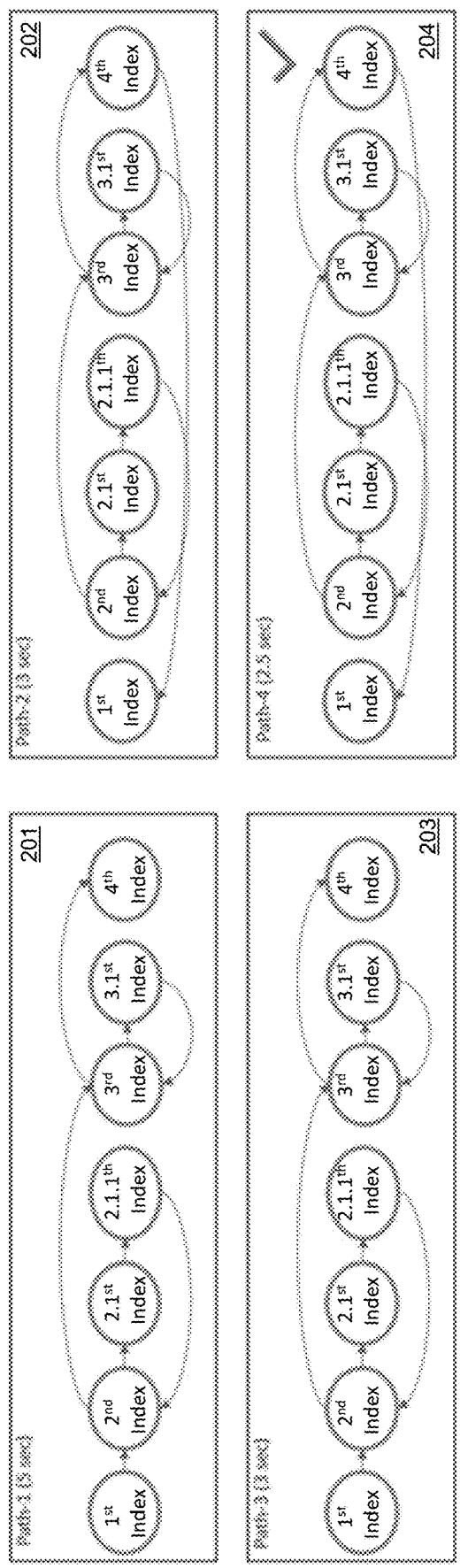
FIG. 2 depicts different possible sequential search paths in an illustrative embodiment.

As can be understood with reference to sample search paths 201, 202, 203 and 204 in FIG. 2, a sequential search approach by itself can produce multiple (e.g., infinite) search paths for the same user input and same output. In the examples in FIG. 2, search paths comprising a $1^{st}$ index, $2^{nd}$ index, $2.1^{st}$ index, $2.1.1^{th}$ index, $3^{rd}$ index, $3.1^{st}$ index and $4^{th}$ index are performed in different orders and require different amounts of time. For example, path 1 201 requires 5 seconds, paths 2 and 3 202 and 203 require 3 seconds, and path 4 204 requires the least amount of time (2.5 seconds), such that path 4 204 is the optimal path. The illustrative embodiments provide an ensemble of a DDPG reinforcement learning model (Model-B) and sequential search techniques (Model-A) to determine and execute the correct order of domains (e.g., indexes) in which to perform a sequential search that would yield the best result (e.g., search performed in the least amount of time with the least compute resources).

Referring to the table 400 in FIG. 4, the search order of the domains varies depending on the domains and constraints in the user request. The table 400 demonstrates the domain search sequences output by the reinforcement learning model (Model-B) which determines the order based on shortest distances (e.g., shortest times) to search each domain. Even if the same domain is included in each user request, the sequence may differ depending on whatever additional domains are present in the user request.

The sequential search engine 140 executes the sequential search model (e.g., Model A) which can perform a domain-based search based on search criteria provided by a user. The reinforcement learning engine 130 executes a reinforcement machine learning model (e.g., Model-B) that is trained over a DDPG algorithm, which is an off-policy algorithm that chooses the best search path. The DDPG reinforcement learning model (Model-B) produces the next action to be performed by the sequential search model (Model-A) based on defined states and computations made by an Actor-Critic ensemble architecture (described in more detail herein below).

In illustrative embodiments, Model-A and Model-B are intertwined, such that Model-B is responsible for deciding the next course of action for Model-A at each step of the sequential search. DDPG is a reinforcement learning mechanism that comprises Q-learning and policy gradients.

Figure 5:
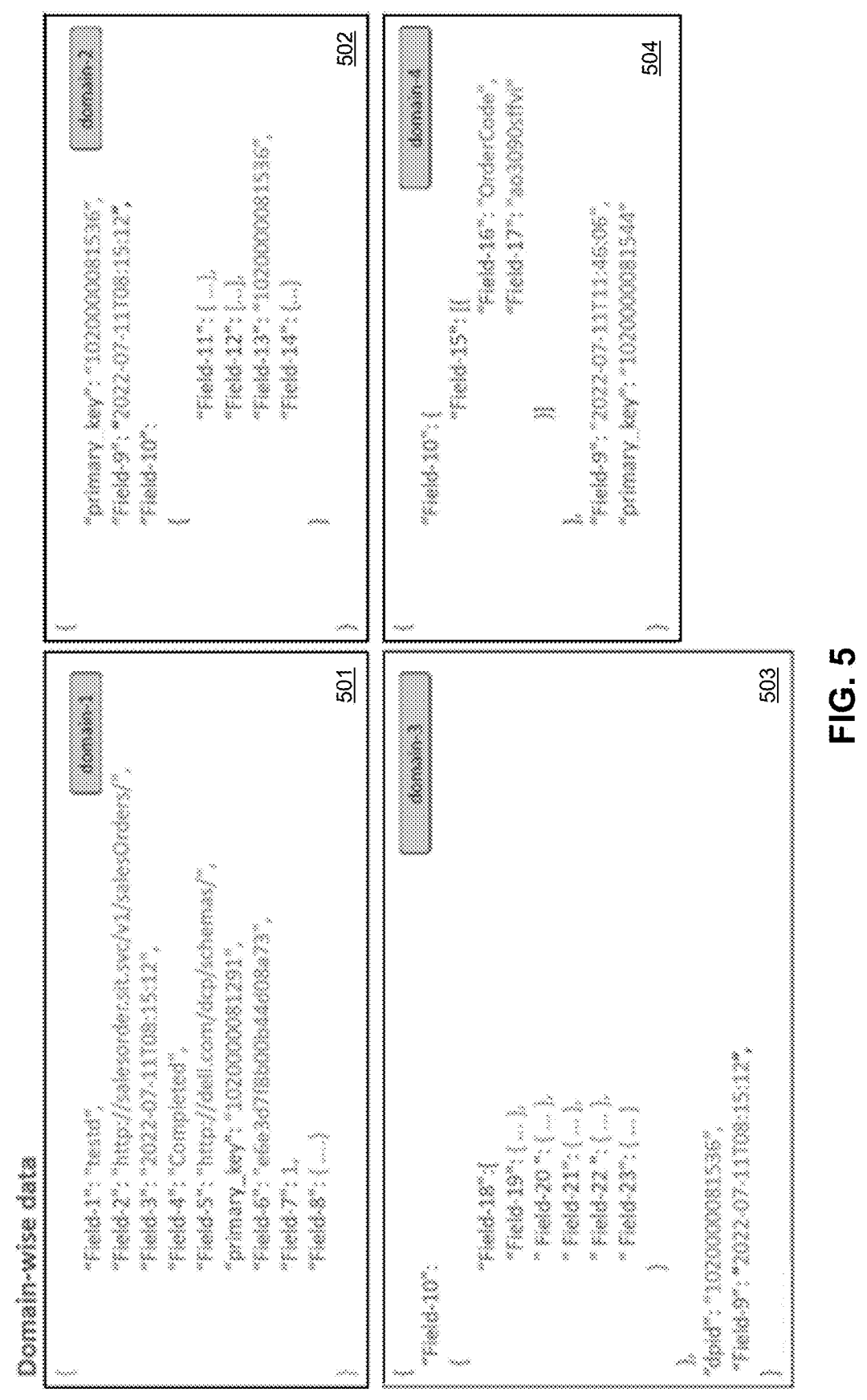

In a domain-based scenario, as shown in FIG. 5, the different domains 501, 502, 503 and 504 have different data models. For example, in the domain data model in FIG. 5, domain-1 501 and domain-3 503 have nothing in common except the primary key field.

Figure 6:
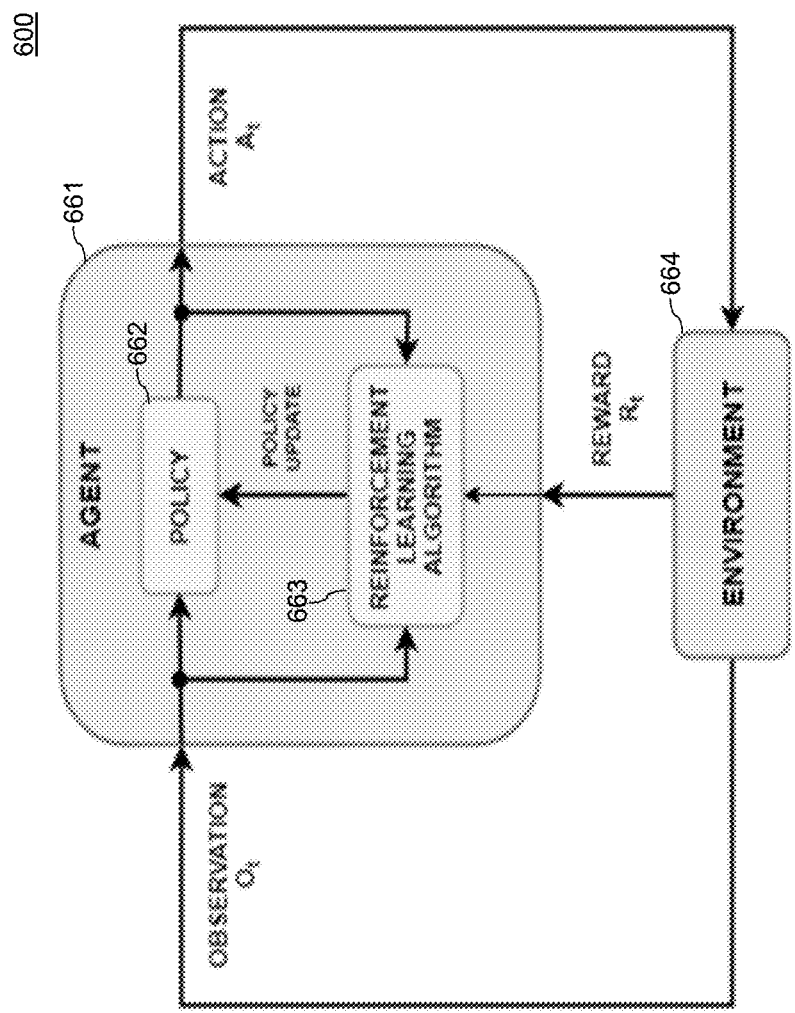
FIG. 6 depicts a block diagram of a reinforcement learning model in an illustrative embodiment.

Referring to the reinforcement learning model 600 in FIG. 6, the training layer 133 trains a reinforcement learning algorithm 663 of the DDPG layer 131 on an environment 664 and uses an agent 661 to learn the optimal or nearly optimal policy 662 that can maximize a reward function. In more detail, the reinforcement learning algorithm 663 learns to optimize the sequential search time and memory resources for incoming queries.

The reinforcement learning algorithm 663 follows the DDPG algorithm, which is configured to handle a continuous action space. For purposes of explanation, a walking robot application demonstrates how the reinforcement technique is implemented. Using a reinforcement model, consider a scenario where a robot needs to be taught how to walk from point A to point B along the path from A to B with the least distance. Any deviation in the path acts as a negative reward while staying along the expected path yields a positive reward. The arm and leg torque of the robot are the controlling factors or hyperparameters on which the model can be trained to learn to walk.

Similarly, the reinforcement learning model of the illustrative embodiments is trained to determine the best search path. Any significant changes from the expected path (e.g., least time and memory resources) can lead to a negative reward $R_t$, while remaining on or close to the expected time and memory resources can lead to a positive reward $R_t$. The reinforcement learning algorithm 663 is implemented using an actor and critic model. The actor passes an action $A_t$ decided on by the actor to the critic, who is responsible for determining a reward $R_t$ for the decided action $A_t$. One or more observations $O_t$ are also recorded for each action $A_t$.

In illustrative embodiments, the sequential search performed by the sequential search engine 140 is used to create an inner join effect when combining data from different NoSQL data stores, regardless of the data schema, as long as there is at least one standard candidate key between two consecutive domains being searched. As used herein, a "standard candidate key" is to be broadly construed to refer to a primary key that is used by all the domains being searched. For instance, if the search is being performed in order, customer and payment domains, and they all have a common primary key called "DPID", then this becomes the standard candidate key for these domains. IDs, SIDs, DPIDs, etc. are indicators used to represent a primary key which is common among domains being searched.

Figure 7:
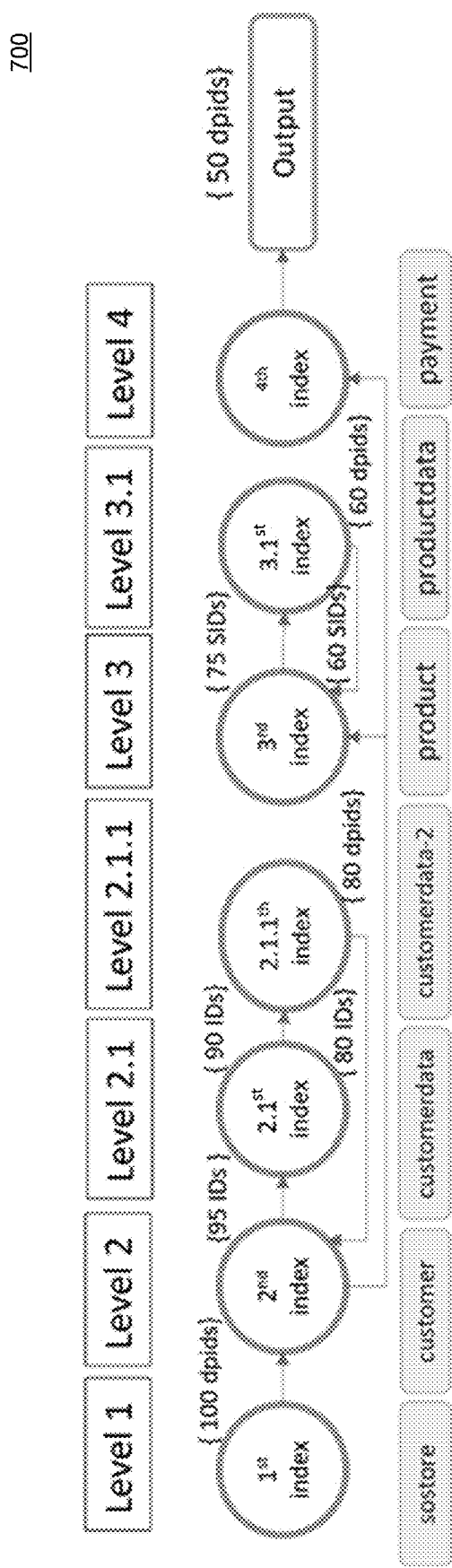
FIG. 7 depicts a sequential search flow in an illustrative embodiment.
Figure 9:
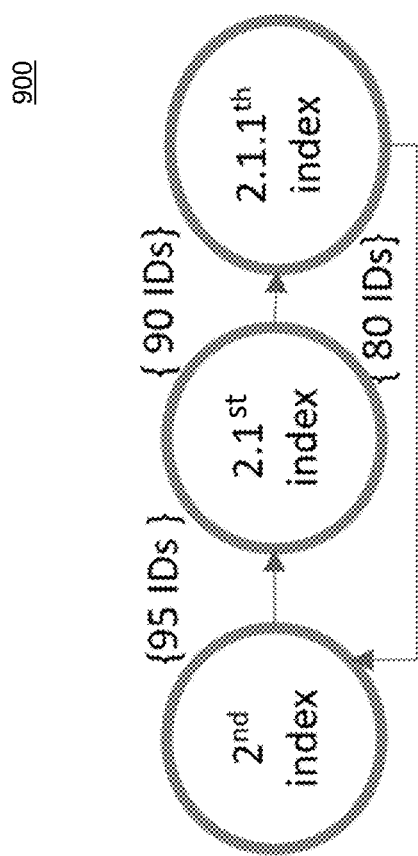
FIG. 9 depicts a portion of the sequential search flow illustrating a depth-first approach for sub-indices in an illustrative embodiment.

Referring to the sequential search flow 700 in FIG. 7, the levels 1, 2, 2.1, 2.1.1, 3 and 3.1 are responsible for sending data to the next level, and to subsequent levels before producing the output (e.g., combined data). Each level is a domain. The domain names are, for example, "sostore," "customer," "customerdata," "customerdata-2," "product," productdata" and "payment." FIG. 9 depicts a portion 900 of the sequential search flow 700 illustrating a depth-first approach for sub-indices. In the case of sub-indices or sub-levels, the depth-first approach is followed. In a depth-first approach, the algorithm starts at a root node in the case of a decision tree and traverses as far as possible along each branch before backtracking.

FIG. 8 depicts example pseudocode 800 for a sequential search algorithm, where an assumption is made that there is no query limit on elastic store data from an infrastructure. Referring to the pseudocode 800, dom_list represents the list of all domains.

Figure 10:
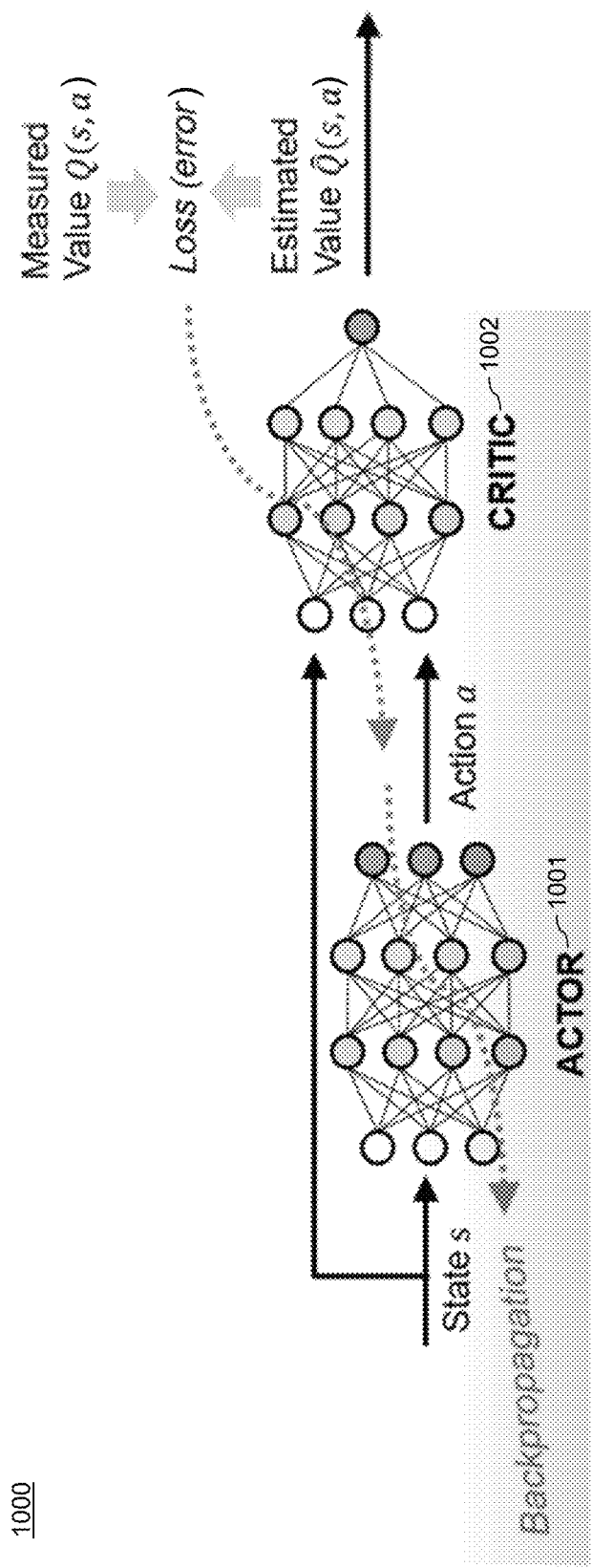
FIG. 10 depicts an operational flow for a deep deterministic policy gradient (DDPG) algorithm in an illustrative embodiment.

Referring to the operational flow 1000 for a DDPG algorithm in FIG. 10, DDPG is an algorithm for learning continuous actions. Like the algorithm to train a robot to walk discussed herein above, a DDPG is used to train a reinforcement model. The DDPG algorithm is configured to analyze a continuous action space. In other words, the DDPG algorithm can operate on any value between a minimum (MIN) and a maximum (Max).

The actor 1001 and critic 1002 comprise deep neural networks. The actor 1001 passes an action a decided on by the actor 1001 to the critic 1002, who is responsible for determining a reward for the decided course of action a. The output from the critic 1002 is a reward function Q. From the loss (error) function, there is a backpropagation to retrain the model with adjusted gradient values. The workflow continues across several epochs until the model has gained a designated level of confidence.

The DDPG model uses experience replay along with the parameters (state s, action a, reward, next_state). Instead of learning from its most recent experience only, the DDPG model learns its next act from accumulated experience, making the DDPG more robust than deep Q-network (DQN) models.

Figure 11:
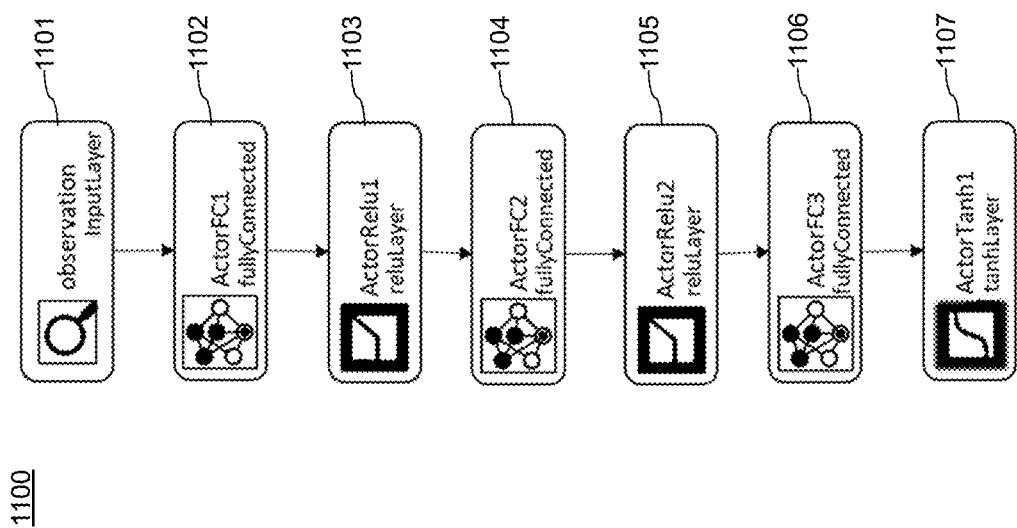
FIG. 11 depicts an operational flow for an actor portion of a DDPG algorithm in an illustrative embodiment.
Figure 12:
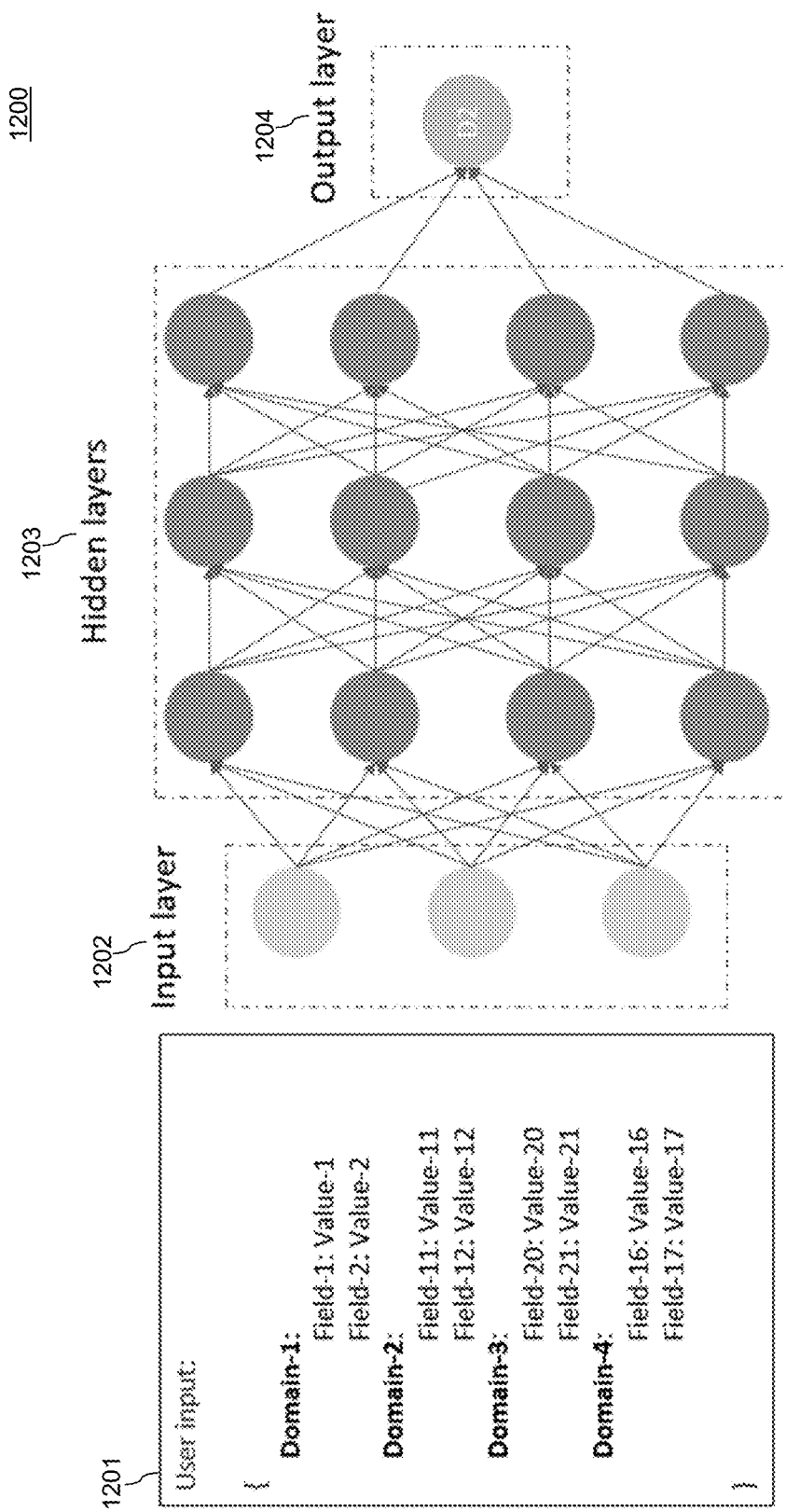
FIG. 12 depicts a fully connected layer of an actor portion of a DDPG algorithm in an illustrative embodiment.

Referring to the operational flow 1100 for an actor portion of a DDPG algorithm shown in FIG. 11 and to the fully connected layer 1200 of an actor portion of a DDPG algorithm depicted in FIG. 12, the actor model is a sequence of fully connected neural networks as well as rectified linear unit (ReLU) activation function and hyperbolic tangent (Tan h) activation function layers. For example, referring to FIG. 11, the actor model comprises an input layer (observation layer 1101), a first fully connected layer (actor FC1 layer 1102), a first ReLU layer (actor ReLU1 layer 1103), a second fully connected layer (actor FC2 layer 1104), a second ReLU layer (actor ReLU2 layer 1105), a third fully connected layer (actor FC3 layer 1106) and a tan h layer (actor Tan h1 layer 1107). In the case of higher dimensionality of the model, more accuracy can be expected from the actor model. In illustrative embodiments, the actor model accepts an observation (e.g., user input 1201), which then is passed through fully connected layers of a deep neural network (input layer 1202, hidden layers 1203, and output layer 1204). These layers have their own set of biases and weights, which are tuned accordingly to yield minimum loss.

The tan h layer 1107 ensures that the result, no matter in which range, always normalizes to a value between −1 and 1. The output of the actor model is the most probable action, which is then fed into the critic model.

Figure 13:
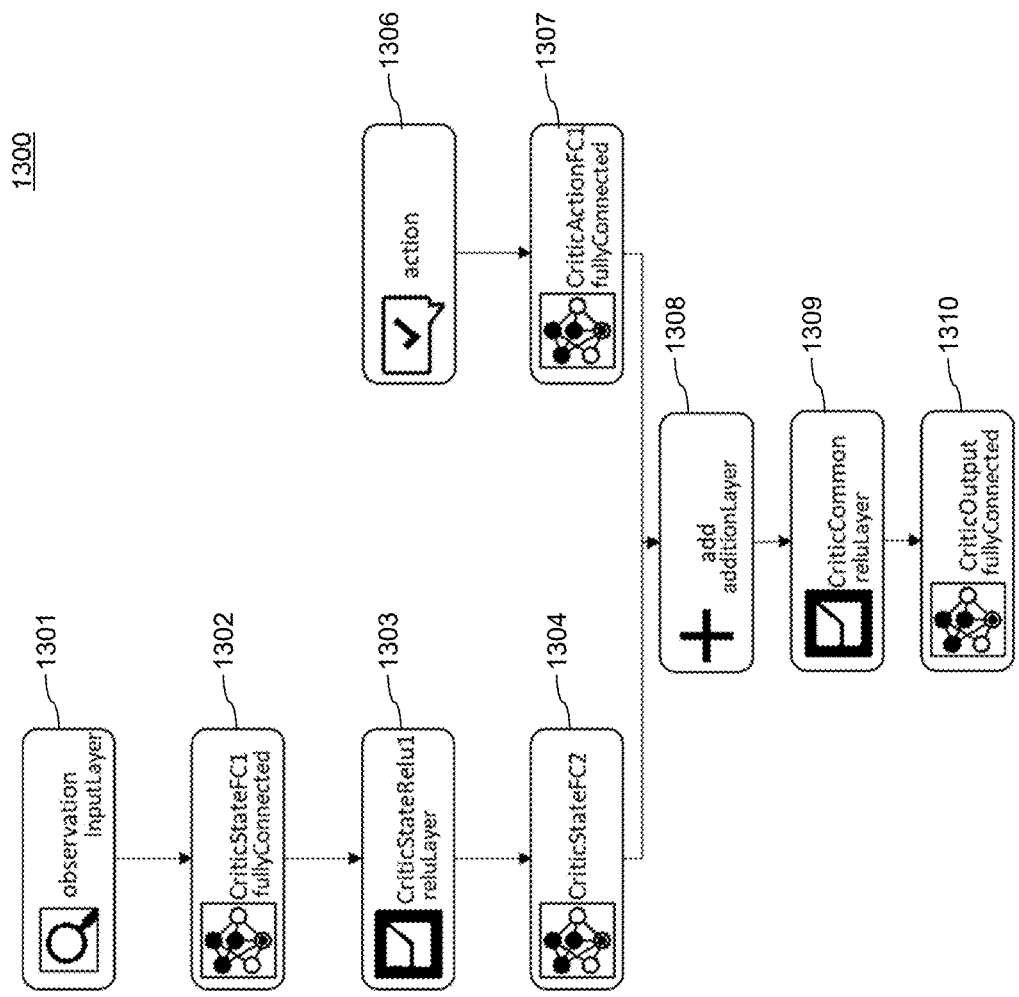
FIG. 13 depicts an operational flow for a critic portion of a DDPG algorithm in an illustrative embodiment.

Referring to the operational flow 1300 for a critic portion of a DDPG algorithm depicted in FIG. 13, the critic model takes both observations (observation layer 1301) and actions (action layer 1306) as inputs, which are then added together (via addition layer 1308) to result in a common branch. The critic model further comprises, in a first branch, a first state fully connected layer (critic state FC1 layer 1302), a first state ReLU layer (critic state ReLU1 layer 1303) and a second state fully connected layer (critic state FC2 layer 1304), and in a second branch, an action fully connected layer (critic action FC1 layer 1307). In addition to the addition layer 1308, the commin branch comprises a common ReLU layer (critic common ReLU layer 1309) and a fully connected output layer (critic output layer 1310). In illustrative embodiments, the output of the critic model comprises a Q function that represents the value q. Since the observation branch (first (longer) branch) has more dimensions than the action branch (second (shorter) branch), more computation is required for the first branch. As a result, more nonlinearity is added to the observation branch than to the action branch. Referring back to FIG. 10, Q(s, a) represents the action value that the critic model determines will happen.

Figures 14A, 14B:
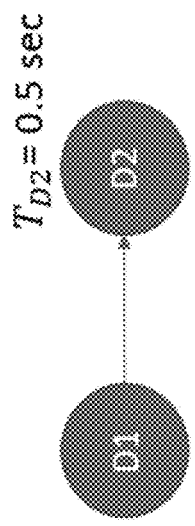
FIGS. 14A and 14B depict a formula and block diagram corresponding to prediction of time taken to process a result for a domain in an illustrative embodiment.

Referring back to FIG. 1, the determined order by which respective ones of a plurality of data collections (e.g., domains) are to be searched by the sequential search engine 140 is based on, for example, a time for searching the respective ones of the plurality of data collections and an amount of memory used in connection with searching the respective ones of the plurality of data collections. In determining the order, the process time computation layer 132 predicts respective values for time to search the respective ones of the plurality of data collections based at least in part on: (i) respective index sizes of the respective ones of the plurality of data collections; and/or (ii) respective numbers of candidate keys received from other ones of the plurality of data collections. For example, FIGS. 14A and 14B depict a formula 1401 and a block diagram 1402 corresponding to the prediction of time taken to process a result for a domain. According to the equation (1), the time taken to process the result for a particular domain ($T_D$) depends directly on the number of candidate keys sent to it from the previous domain ($N_c$) and its own index size (S).

$$T_D \propto S N_{c'} \quad (1)$$

As can be seen in the formula 1401 in FIG. 14A, the number of candidate keys ($N_c$) produced by a domain is directly correlated to the size of its index (S), as well as inversely proportional to the number of user input parameters for that domain ($N_p$). K is a constant and can be decided based on the most optimal value. To decide on an optimal value for $T_D$, the model must consider the best tradeoff between S and $N_{c'}$ at each step.

Index size depends on the storage capacity of the NoSQL store being used. For example, in the case of Elasticsearch or MongoDB, there may be a fixed store/index size for the documents being persisted. Index size in this context refers to the maximum allowed size of respective NoSQL stores. Candidate keys comprise common keys between the domains being searched. Candidate keys may be outputted as results of searches being performed. For example, where Domain-1 {"id": "123", "type": "abc" } {"id": "234", "type": "def" } and Domain-2 {"id": "123", "description": "xyz" }, if the search is for the joint result for "abc" type from Domain-1 and "xyz" description from Domain-2, then the primary key value id "123" is a common output.

Any state transition above the value of $T_{transition} \geq T_0$ is eliminated from the universal set of possible state transitions. To is a constant that can be adjusted as per the requirement of the semi-policy.

In some illustrative embodiments, in determining the order, the process time computation layer 132 predicts respective values for time to search the respective ones of the plurality of data collections based at least in part on respective ones of the one or more constraints corresponding to the respective ones of the plurality of data collections. As noted herein, the constraints may comprise, for example, one or more fields of a plurality of domains specified in a query received by the query collection engine 120.

FIG. 15 depicts a table 1500 of operational data for a plurality of domains that is used by the training layer 133 to train a DDPG algorithm. The operational data for each domain (Domain-1, -2, -3, -4 and -5) is maintained by the join operation management platform 110 and is used for training the DDPG algorithm. In illustrative embodiments, the training layer 133 has access to retrieve the data from the domains with no index size restrictions on the elastic store. Some example categories for the training data include, but are not necessarily limited to, result count (e.g., number of data points from the search), time taken to search, search parameters (e.g., constraints), number of search parameters and size of the domain. In illustrative embodiments, the DDPG algorithm may view each state, each domain, and each action as a transition from one state to the next. The model is configured to continuously select the next domain to search that will yield an optimal result (e.g., least time and memory resources) based on a current situation.

Figure 16:
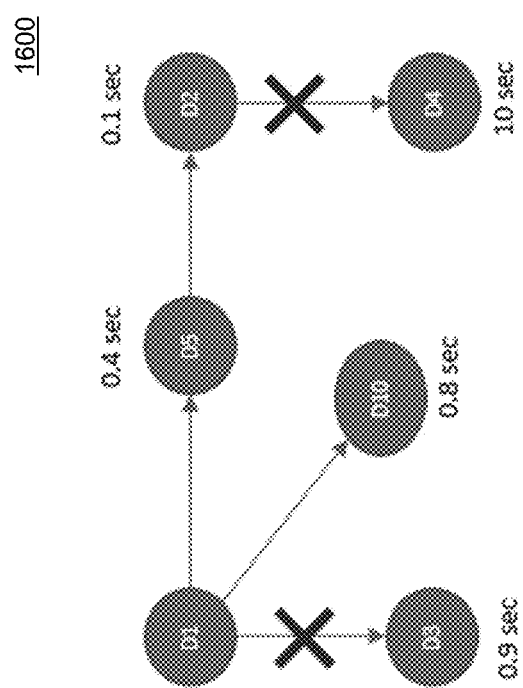
FIG. 16 depicts restrictive state action based on time in connection with a DDPG algorithm in an illustrative embodiment.

FIG. 16 depicts a restrictive state-action space 1600 based on time in connection with a DDPG algorithm. In more detail, in order to narrow down a search space, the DDPG layer 131 designates a maximum value for the time to search the respective ones of the plurality of data collections, such that times exceeding the maximum value are discarded. DDPG is an off-policy approach that usually utilizes greedy or F-greedy policy based on the current Q function. To narrow down the search space for the greedy off-policy approach, illustrative embodiments implement a midway strategy between off-policy and on-policy (e.g., learning from trajectories created by the current policy) methods. In the semi-policy method, the embodiments restrict the number of total possible actions. For example, the semi-policy approach introduces a restrictive state-action space 1600 for the model to train based on certain criteria. In a non-limiting example, referring to the restrictive state-action space 1600, if the cut-off value for $T_D$ is pre-determined to be 0.9 seconds, the DDPG model eliminates all state transitions that take greater than or equal to 0.9 seconds. As a result, the permissible action space and spatial complexity of the model is significantly reduced and the space efficiency of the model is improved. FIG. 17 depicts example pseudocode 1700 for defining a custom environment, an action space and an observation space for a DDPG algorithm. For each action, there are N−1 choices to select the next domain, considering there are N domains in total.

FIG. 18 depicts example pseudocode 1800 for defining customized reset and next observation functions for a DDPG algorithm. In the pseudocode 1800, the portion which states "while(calculate(self.df.loc[selfcurrent step], self.df.loc[selflast action])>TRANSITION_LIMIT): self.current_step=random.randint(0, len(selfdfloc[:, 'index_name'].values)−N)" represents the implementation of the semi-policy. The calculate(arg*, arg*) method is responsible for determining the value of $T_D$.

FIGS. 19, 20 and 21 depict example pseudocode 1900, 2000 and 2100 for: (i) defining a sequential search environment for a DDPG algorithm; (ii) defining actor and critic optimization for a DDPG algorithm; and (iii) updating critic and actor networks for a DDPG algorithm, respectively. The optimal search path selected by the search path selection layer 134 and determined by the DDPG layer 131 is based on maximum reward (e.g., when the DDPG model has learned the policy $\mu_\theta$) which yields the action that maximizes the Q-function Q(s, a).

Figure 22:
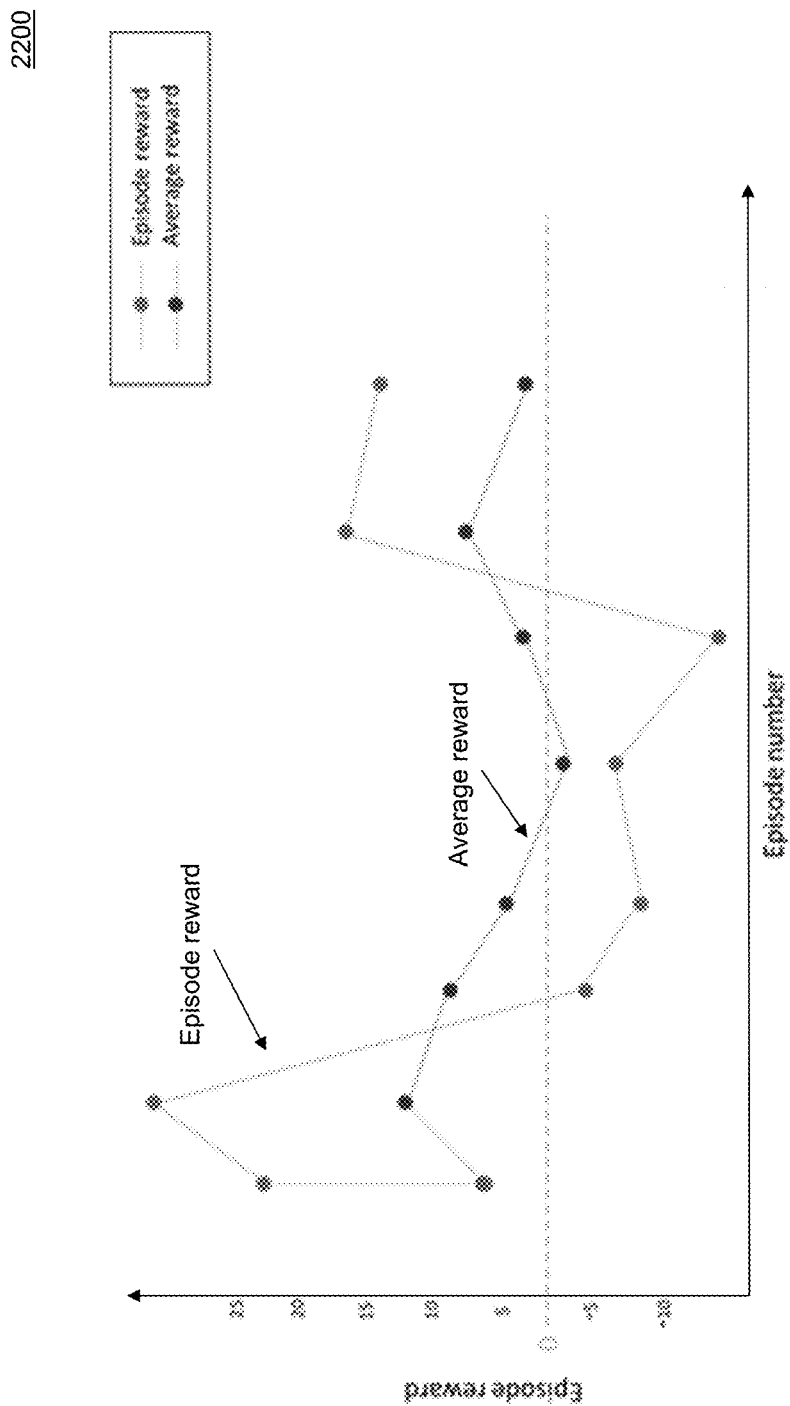
FIG. 22 depicts a graph of per episode and average reward outputs of a DDPG algorithm in an illustrative embodiment.

FIG. 22 depicts a graph 2200 of per episode and average reward outputs of a DDPG algorithm. The per episode and average reward function is obtained after the model's training, where an episode is defined as each decision taken by the model to move forward. The average reward function can be considered as the reward function as calculated over several epochs, where each epoch can be considered as a collection of several such episodes.

Figure 23:
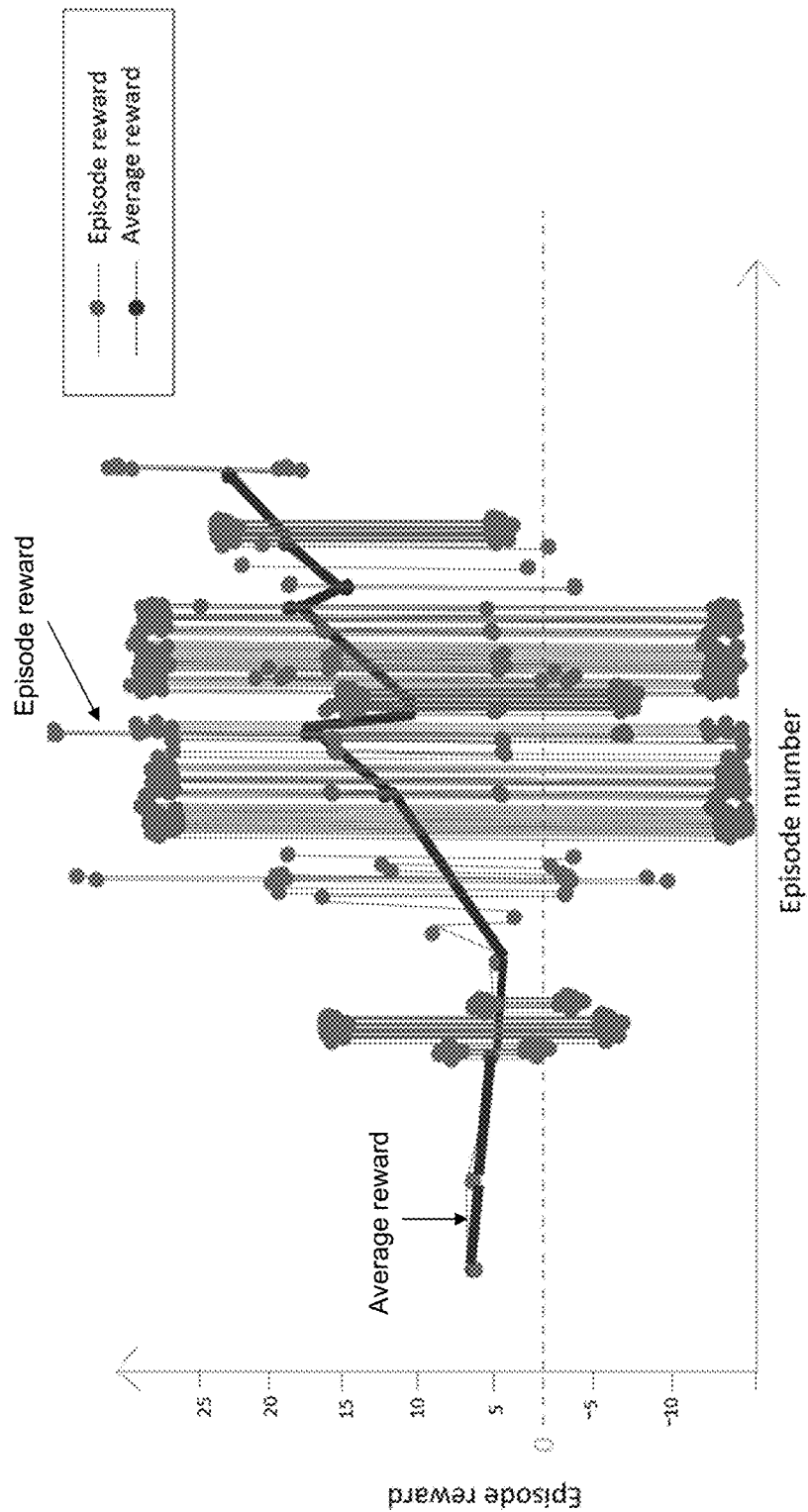
FIG. 23 depicts a graph showing a moving average reward output of a DDPG algorithm in an illustrative embodiment.

FIG. 23 depicts a graph 2300 showing a moving average reward output of a DDPG algorithm. Eventually, after training the model for multiple epochs (e.g., over 1000 epochs), the reward function proceeds along an upward curve (rise) until the training stops. The average reward function represents the moving average value. The end result can be interpreted such that as a result of the training, the reward settles at an optimal value.

According to one or more embodiments, the databases 103 and other data repositories or databases referred to herein are implemented using one or more storage systems or devices associated with the join operation management platform 110. In some embodiments, one or more of the storage systems utilized to implement the databases 103 and other data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the join operation management platform 110, the query collection engine 120, reinforcement learning engine 130, sequential search engine 140 and/or output engine 150 in other embodiments can be implemented at least in part externally to the join operation management platform 110, for example, as stand-alone servers, sets of servers or other types of systems coupled to the network 104. For example, the query collection engine 120, reinforcement learning engine 130, sequential search engine 140 and/or output engine 150 may be provided as cloud services accessible by the join operation management platform 110.

The query collection engine 120, reinforcement learning engine 130, sequential search engine 140 and/or output engine 150 in the FIG. 1 embodiment are each assumed to be implemented using at least one processing device. Each such processing device generally comprises at least one processor and an associated memory, and implements one or more functional modules for controlling certain features of the query collection engine 120, reinforcement learning engine 130, sequential search engine 140 and/or output engine 150.

At least portions of the join operation management platform 110 and the elements thereof may be implemented at least in part in the form of software that is stored in memory and executed by a processor. The join operation management platform 110 and the elements thereof comprise further hardware and software required for running the join operation management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the query collection engine 120, reinforcement learning engine 130, sequential search engine 140, output engine 150 and other elements of the join operation management platform 110 in the present embodiment are shown as part of the join operation management platform 110, at least a portion of the query collection engine 120, reinforcement learning engine 130, sequential search engine 140, output engine 150 and other elements of the join operation management platform 110 in other embodiments may be implemented on one or more other processing platforms that are accessible to the join operation management platform 110 over one or more networks. Such elements can each be implemented at least in part within another system element or at least in part utilizing one or more stand-alone elements coupled to the network 104.

It is assumed that the join operation management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the query collection engine 120, reinforcement learning engine 130, sequential search engine 140, output engine 150 and other elements of the join operation management platform 110, and the elements thereof can each be implemented in the form of one or more LXCs running on one or more VMs. Other arrangements of one or more processing devices of a processing platform can be used to implement the query collection engine 120, reinforcement learning engine 130, sequential search engine 140 and output engine 150, as well as other elements of the join operation management platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the join operation management platform 110 to reside in different data centers. Numerous other distributed implementations of the join operation management platform 110 are possible.

Accordingly, one or each of the query collection engine 120, reinforcement learning engine 130, sequential search engine 140, output engine 150 and other elements of the join operation management platform 110 can each be implemented in a distributed manner so as to comprise a plurality of distributed elements implemented on respective ones of a plurality of compute nodes of the join operation management platform 110.

It is to be appreciated that these and other features of illustrative embodiments are presented by way of example only, and should not be construed as limiting in any way. Accordingly, different numbers, types and arrangements of system elements such as the query collection engine 120, reinforcement learning engine 130, sequential search engine 140, output engine 150 and other elements of the join operation management platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the join operation management platform can be offered to cloud infrastructure customers or other users as part of FaaS, CaaS and/or PaaS offerings.

Figure 24:
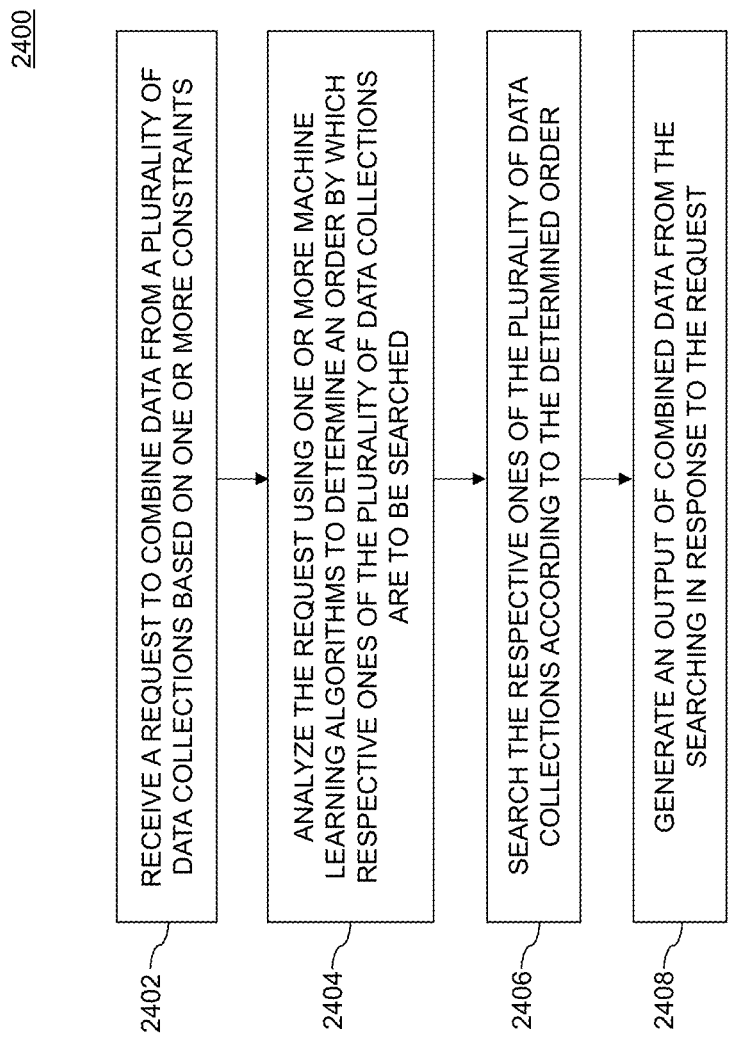
FIG. 24 depicts a process for join operation management according to an illustrative embodiment.

The operation of the information processing system 100 will now be described in further detail with reference to the flow diagram of FIG. 24. With reference to FIG. 24, a process 2400 for join operation management as shown includes steps 2402 through 2408, and is suitable for use in the system 100 but is more generally applicable to other types of information processing systems comprising a join operation management platform configured for managing join operations.

In step 2402, a request is received to combine data from a plurality of data collections based on one or more constraints. In illustrative embodiments, the plurality of data collections correspond to one or more NoSQL databases, and the plurality of data collections comprise a plurality of domains of the one or more NoSQL databases. The one or more constraints may comprise one or more fields of the plurality of domains, and the request to combine the data can comprise a request to perform a join operation.

In step 2404, the request is analyzed using one or more machine learning algorithms to determine an order by which respective ones of the plurality of data collections are to be searched. In illustrative embodiments, the one or more machine learning algorithms comprise a reinforcement learning algorithm such as, for example, a DDPG reinforcement learning algorithm.

In step 2406, the respective ones of the plurality of data collections are searched according to the determined order. In illustrative embodiments, the searching of the respective ones of the plurality of data collections comprises using one or more parameters from a previous one of the plurality of data collections in the determined order when searching a next one of the plurality of data collections in the determined order. In step 2408, an output of combined data from the searching is generated in response to the request.

In illustrative embodiments, the determined order is based on at least one of a time for searching the respective ones of the plurality of data collections and an amount of memory used in connection with searching the respective ones of the plurality of data collections. In determining the order by which the respective ones of the plurality of data collections are to be searched, the one or more machine learning algorithms predict respective values for time to search the respective ones of the plurality of data collections based at least in part on: (i) respective index sizes of the respective ones of the plurality of data collections; (ii) respective numbers of candidate keys received from other ones of the plurality of data collections; and/or (ii) respective ones of the one or more constraints corresponding to the respective ones of the plurality of data collections.

The one or more machine learning algorithms may be trained with training data comprising information about one or more searches of the respective ones of the plurality of data collections that have been previously performed. A maximum value for the time to search the respective ones of the plurality of data collections may be designated for training in order to simplify the model.

It is to be appreciated that the FIG. 24 process and other features and functionality described above can be adapted for use with other types of information systems configured to execute join operation management services in a join operation management platform or other type of platform.

The particular processing operations and other system functionality described in conjunction with the flow diagram of FIG. 24 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 24 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a join operation management platform as disclosed herein can provide a number of significant advantages relative to conventional arrangements. For example, the join operation management platform effectively provides for domain-based join operations by combining sequential search techniques with a DDPG reinforcement learning algorithm. The embodiments advantageously implement scalable join operations with the ability to search an unlimited number of domains with minimal impact on system resources.

NoSQL databases are typically designed to function as schema-less data stores, and there may not be any relation between two collections or containers. In such situations, a "$lookup" query may be used to produce a left outer join. However, the $lookup query uses enormous amounts of memory and space resources at such undesirably high costs that such operations are rarely if ever used. Additionally, such join operations are limited to nested tables, requiring exponential space complexity, or left outer joins for same-hierarchy tables. Inner joins in linear space complexity are not possible with current techniques.

Moreover, with conventional approaches, NoSQL joins lack flexibility. The creation of a single item or collection renders it impossible to accommodate domain-based scenarios since all the data to be queried cannot be added to a single document. Additionally, amounts of data exceeding the allowable size of documents are not able to be merged. Under current techniques, NoSQL join operations are not tunable. For example, once reference and embedded documents have been manually chosen, it is difficult to switch them, requiring complicated changes to the join query. The embodiments advantageously provide control over the order of joins, so that the order can be chosen and dynamically changed to make the most efficient use of time and memory.

Furthermore, sequential searching provides a method for performing a succession of domain-based searches one after the other, where each domain search depends on the parameters supplied by the result of the preceding domain search until a result is produced that contains all candidate keys from all the domains. The embodiments advantageously offer a solution to an off-policy strategy of a DDPG model by limiting its state-action space through pre-processing and removing redundancy.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the join operation management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a join operation management platform in illustrative embodiments. These and other cloud-based systems in illustrative embodiments can include object stores.

Illustrative embodiments of processing platforms will now be described in greater detail with reference to FIGS. 25 and 26. Although described in the context of system 100, these platforms may also be used to implement at least portions of other information processing systems in other embodiments.

Figure 25:
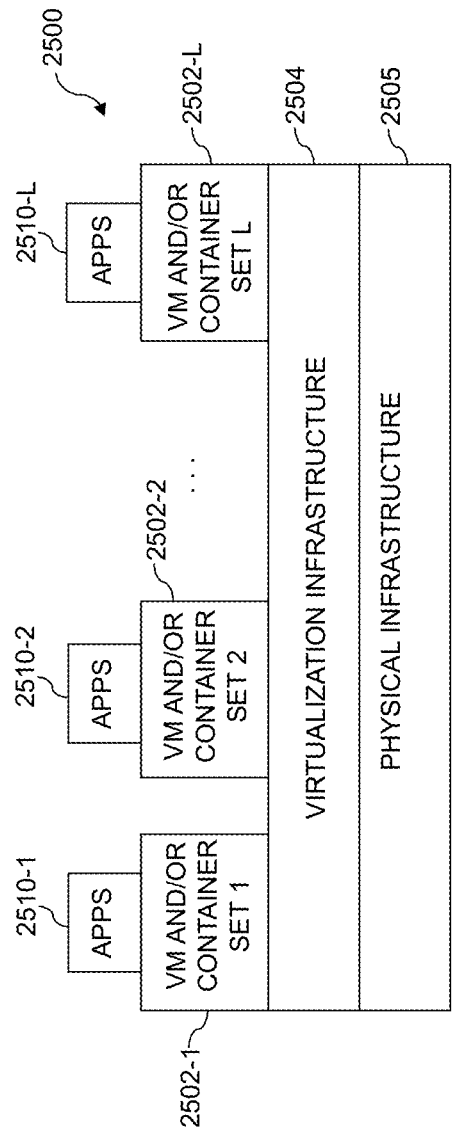
FIGS. 25 and 26 show examples of processing platforms that may be utilized to implement at least a portion of an information processing system according to illustrative embodiments.
Figure 26:
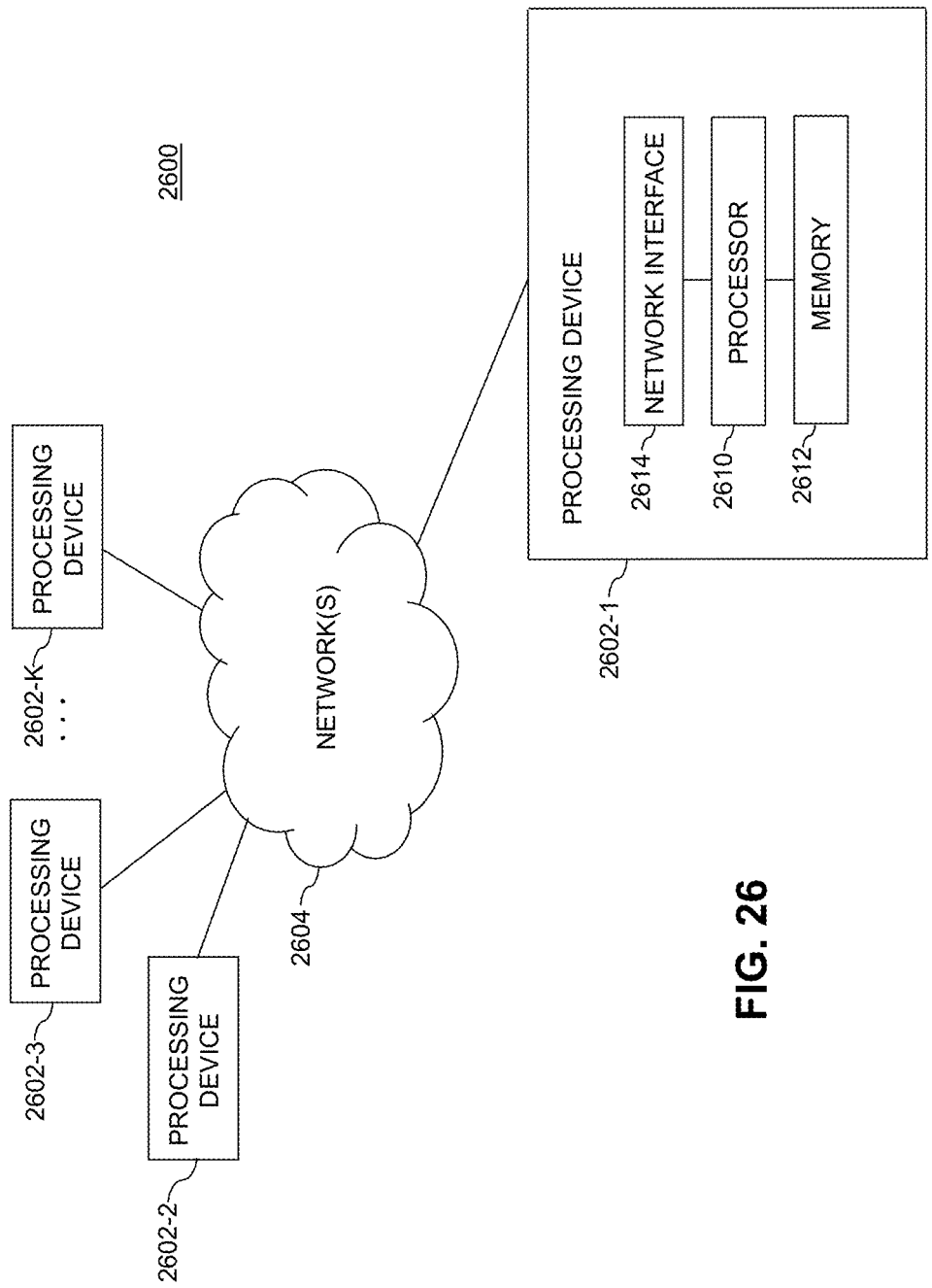

FIG. 25 shows an example processing platform comprising cloud infrastructure 2500. The cloud infrastructure 2500 comprises a combination of physical and virtual processing resources that may be utilized to implement at least a portion of the information processing system 100. The cloud infrastructure 2500 comprises multiple virtual machines (VMs) and/or container sets 2502-1, 2502-2, . . . 2502-L implemented using virtualization infrastructure 2504. The virtualization infrastructure 2504 runs on physical infrastructure 2505, and illustratively comprises one or more hypervisors and/or operating system level virtualization infrastructure. The operating system level virtualization infrastructure illustratively comprises kernel control groups of a Linux operating system or other type of operating system.

The cloud infrastructure 2500 further comprises sets of applications 2510-1, 2510-2, . . . 2510-L running on respective ones of the VMs/container sets 2502-1, 2502-2, . . . 2502-L under the control of the virtualization infrastructure 2504. The VMs/container sets 2502 may comprise respective VMs, respective sets of one or more containers, or respective sets of one or more containers running in VMs.

In some implementations of the FIG. 25 embodiment, the VMs/container sets 2502 comprise respective VMs implemented using virtualization infrastructure 2504 that comprises at least one hypervisor. A hypervisor platform may be used to implement a hypervisor within the virtualization infrastructure 2504, where the hypervisor platform has an associated virtual infrastructure management system. The underlying physical machines may comprise one or more distributed processing platforms that include one or more storage systems.

In other implementations of the FIG. 25 embodiment, the VMs/container sets 2502 comprise respective containers implemented using virtualization infrastructure 2504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 2500 shown in FIG. 25 may represent at least a portion of one processing platform. Another example of such a processing platform is processing platform 2600 shown in FIG. 26.

The processing platform 2600 in this embodiment comprises a portion of system 100 and includes a plurality of processing devices, denoted 2602-1, 2602-2, 2602-3, . . . 2602-K, which communicate with one another over a network 2604.

The network 2604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2602-1 in the processing platform 2600 comprises a processor 2610 coupled to a memory 2612. The processor 2610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 2612 may comprise random access memory (RAM), read-only memory (ROM), flash memory or other types of memory, in any combination. The memory 2612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2602-1 is network interface circuitry 2614, which is used to interface the processing device with the network 2604 and other system components, and may comprise conventional transceivers.

The other processing devices 2602 of the processing platform 2600 are assumed to be configured in a manner similar to that shown for processing device 2602-1 in the figure.

Again, the particular processing platform 2600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the join operation management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and join operation management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

receiving a request to combine data from a plurality of data collections based on one or more constraints;

analyzing the request using one or more machine learning algorithms to determine an order by which respective ones of the plurality of data collections are to be searched;

searching the respective ones of the plurality of data collections according to the determined order, wherein the searching comprises using one or more parameters from a previous one of the plurality of data collections in the determined order when searching a next one of the plurality of data collections in the determined order, wherein a maximum time to search the respective ones of the plurality of data collections is designated, and wherein one or more search actions exceeding the maximum time are discarded; and generating an output of combined data from the searching in response to the request;

wherein the one or machine learning algorithms are iteratively trained based on backpropagation from a loss function; and wherein the steps of the method are executed by a processing device operatively coupled to a memory.

2. The method of claim 1 wherein the plurality of data collections correspond to one or more not only structured query language (NoSQL) databases.

3. The method of claim 2 wherein the plurality of data collections comprise a plurality of domains of the one or more NoSQL databases.

4. The method of claim 3 wherein the one or more constraints comprise one or more fields of the plurality of domains.

5. The method of claim 1 wherein the one or more machine learning algorithms comprise a reinforcement learning algorithm.

6. The method of claim 5 wherein the one or more machine learning algorithms comprise a deep deterministic policy gradient reinforcement learning algorithm.

7. The method of claim 1 wherein the request to combine the data comprises a request to perform a join operation.

8. The method of claim 1 wherein the determined order is based on at least one of a time for searching the respective ones of the plurality of data collections and an amount of memory used in connection with searching the respective ones of the plurality of data collections.

9. The method of claim 1 wherein, in determining the order by which the respective ones of the plurality of data collections are to be searched, the one or more machine learning algorithms predict respective values for time to search the respective ones of the plurality of data collections based at least in part on respective index sizes of the respective ones of the plurality of data collections.

10. The method of claim 9 wherein, in determining the order by which the respective ones of the plurality of data collections are to be searched, the one or more machine learning algorithms predict the respective values for time to search the respective ones of the plurality of data collections further based at least in part on respective numbers of candidate keys received from other ones of the plurality of data collections.

11. The method of claim 9 wherein, in determining the order by which the respective ones of the plurality of data collections are to be searched, the one or more machine learning algorithms predict the respective values for time to search the respective ones of the plurality of data collections further based at least in part on respective ones of the one or more constraints corresponding to the respective ones of the plurality of data collections.

12. The method of claim 1 further comprising training the one or more machine learning algorithms with training data comprising information about one or more searches of the respective ones of the plurality of data collections that have been previously performed.

13. An apparatus comprising:
a physical processing device operatively coupled to a memory and configured:
to receive a request to combine data from a plurality of data collections based on one or more constraints;
to analyze the request using one or more machine learning algorithms to determine an order by which respective ones of the plurality of data collections are to be searched;
to search the respective ones of the plurality of data collections according to the determined order, wherein the searching comprises using one or more parameters from a previous one of the plurality of data collections in the determined order when searching a next one of the plurality of data collections in the determined order, wherein a maximum time to search the respective ones of the plurality of data collections is designated, and wherein one or more search actions exceeding the maximum time are discarded; and
to generate an output of combined data from the searching in response to the request;
wherein the one or machine learning algorithms are iteratively trained based on backpropagation from a loss function.

14. The apparatus of claim 13 wherein, in determining the order by which the respective ones of the plurality of data collections are to be searched, the one or more machine learning algorithms predict respective values for time to search the respective ones of the plurality of data collections based at least in part on respective index sizes of the respective ones of the plurality of data collections.

15. The apparatus of claim 14, wherein, in determining the order by which the respective ones of the plurality of data collections are to be searched, the one or more machine learning algorithms predict the respective values for time to search the respective ones of the plurality of data collections further based at least in part on respective numbers of candidate keys received from other ones of the plurality of data collections.

16. The apparatus of claim 13, wherein the physical processing device is further configured to train the one or more machine learning algorithms with training data comprising information about one or more searches of the respective ones of the plurality of data collections that have been previously performed.

17. An article of manufacture comprising a non-transitory processor-readable storage medium having stored therein program code of one or more software programs, wherein the program code when executed by at least one processing device causes said at least one processing device to perform the steps of:
receiving a request to combine data from a plurality of data collections based on one or more constraints;
analyzing the request using one or more machine learning algorithms to determine an order by which respective ones of the plurality of data collections are to be searched;
searching the respective ones of the plurality of data collections according to the determined order, wherein the searching comprises using one or more parameters from a previous one of the plurality of data collections in the determined order when searching a next one of the plurality of data collections in the determined order, wherein a maximum time to search the respective ones of the plurality of data collections is designated, and wherein one or more search actions exceeding the maximum time are discarded; and
generating an output of combined data from the searching in response to the request;
wherein the one or machine learning algorithms are iteratively trained based on backpropagation from a loss function.

18. The article of manufacture of claim 17 wherein, in determining the order by which the respective ones of the plurality of data collections are to be searched, the one or more machine learning algorithms predict respective values for time to search the respective ones of the plurality of data collections based at least in part on respective index sizes of the respective ones of the plurality of data collections.

19. The article of manufacture of claim 18, wherein, in determining the order by which the respective ones of the plurality of data collections are to be searched, the one or more machine learning algorithms predict the respective values for time to search the respective ones of the plurality of data collections further based at least in part on respective numbers of candidate keys received from other ones of the plurality of data collections.

20. The article of manufacture of claim 17, wherein the program code further causes said at least one processing device to train the one or more machine learning algorithms with training data comprising information about one or more searches of the respective ones of the plurality of data collections that have been previously performed.

* * * * *